(12) United States Patent
Quatmann et al.

(10) Patent No.: US 9,487,298 B2
(45) Date of Patent: Nov. 8, 2016

(54) SEAT MODIFICATION ASSEMBLY AND AIRCRAFT PASSENGER SEAT COMPRISING A SEAT MODIFICATION ASSEMBLY

(71) Applicant: Airbus Operations GmbH, Hamburg (DE)

(72) Inventors: Frank Quatmann, Hamburg (DE); Seraj Mazidi, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 14/562,939

(22) Filed: Dec. 8, 2014

(65) Prior Publication Data

US 2015/0158593 A1    Jun. 11, 2015

(51) Int. Cl.
| | |
|---|---|
| *B60N 2/26* | (2006.01) |
| *B64D 11/06* | (2006.01) |
| *B60N 2/70* | (2006.01) |
| *B60N 2/48* | (2006.01) |
| *B60N 2/66* | (2006.01) |
| *B60N 2/28* | (2006.01) |

(Continued)

(52) U.S. Cl.
CPC ............ *B64D 11/0639* (2014.12); *B60N 2/26* (2013.01); *B60N 2/2866* (2013.01); *B60N 2/449* (2013.01); *B60N 2/46* (2013.01); *B60N 2/4879* (2013.01); *B60N 2/66* (2013.01); *B60N 2/7005* (2013.01); *B64D 11/062* (2014.12); *B64D 11/0612* (2014.12); *B64D 11/0647* (2014.12); *B64D 11/0693* (2013.01)

(58) Field of Classification Search
CPC .... B60N 2/7005; B60N 2/64; B60N 2/4879; B60N 2/4673; B60N 2/66; B60N 2/245; B60N 2/2866; B60N 2/28; B64D 11/0639; B64D 11/06

USPC ............... 297/228.13, 256.1, 256.16, 250.1, 297/230.1, 230.11, 230.12, 230.13, 230.14, 297/254–255, 219.1, 219.12, 220, 251, 337, 297/338, 394, 397, 400, 406, 411.2, 411.23, 297/411.24, 411.35, 411.37, 440.14, 284.5
See application file for complete search history.

(56) References Cited

U.S. PATENT DOCUMENTS 2,081,111 A * 5/1937 Manley ............... B60N 2/7005
                                                  297/284.9
2,667,913 A * 2/1954 Dustin .................... A61H 3/00
                                                     297/252

(Continued)

FOREIGN PATENT DOCUMENTS

| DE | 102008053140 | 6/2010 |
|---|---|---|
| GB | 2472836 | 2/2011 |

(Continued)

OTHER PUBLICATIONS

European Search Report, Feb. 7, 2014.

*Primary Examiner* — Beth Stephan
(74) *Attorney, Agent, or Firm* — Greer, Burns & Crain, Ltd.

(57) ABSTRACT

A seat modification assembly for use with a passenger seat provided in a mass transport vehicle, especially an aircraft, comprises at least one seat modification element adapted to change the ergonomic seating profile of a passenger seat provided with the seat modification assembly. The at least one seat modification element comprises at least one mounting arrangement adapted for detachably mounting the seat modification element to a portion of the passenger seat.

16 Claims, 3 Drawing Sheets

(51) Int. Cl.
*B60N 2/44* (2006.01)
*B60N 2/46* (2006.01)

(56) References Cited

U.S. PATENT DOCUMENTS

| | | | | |
|---|---|---|---|---|
| 3,220,767 A * | 11/1965 | Hendrickson | A47C 7/021 | 297/228.12 |
| 3,266,841 A * | 8/1966 | Altman | A47C 7/386 | 297/220 |
| 3,279,849 A * | 10/1966 | Radke | A47C 7/425 | 297/284.5 |
| 3,542,421 A * | 11/1970 | Ambrose | A47C 7/425 | 297/230.12 |
| 3,608,964 A * | 9/1971 | Earl | A47C 7/383 | 297/397 |
| 3,709,558 A * | 1/1973 | Jakob | B60N 2/2806 | 24/193 |
| 4,206,945 A * | 6/1980 | Kifferstein | B60N 2/6036 | 297/220 |
| 4,362,334 A * | 12/1982 | Ross | A47C 7/405 | 297/230.12 |
| 4,597,386 A * | 7/1986 | Goldstein | A61F 5/01 | 297/204 |
| 4,759,588 A * | 7/1988 | Husnik | B60N 2/2839 | 297/181 |
| 4,824,169 A * | 4/1989 | Jarrell | A47C 7/022 | 297/230.1 |
| 4,862,536 A * | 9/1989 | Pruit | A47C 7/46 | 297/230.14 |
| 4,889,388 A * | 12/1989 | Hime | A47C 7/425 | 297/256.17 |
| 5,147,110 A * | 9/1992 | Syers | B60N 2/6027 | 297/220 |
| 5,149,173 A * | 9/1992 | Jay | A61G 5/12 | 297/284.9 |
| 5,161,855 A * | 11/1992 | Harmon | B60N 2/3084 | 297/238 |
| 5,224,924 A * | 7/1993 | Urso | A61F 5/024 | 135/71 |
| 5,407,248 A * | 4/1995 | Jay | A61G 5/10 | 297/284.1 |
| 5,448,938 A * | 9/1995 | Fernandez | B60N 2/6009 | 109/49.5 |
| 5,456,519 A * | 10/1995 | Davis | A47C 7/425 | 297/219.1 |
| 5,564,786 A * | 10/1996 | Peek | A61G 5/10 | 280/250.1 |
| 5,567,015 A * | 10/1996 | Arias | A47C 7/383 | 297/397 |
| 5,645,317 A * | 7/1997 | Onishi | B60N 2/28 | 297/250.1 |
| 5,707,108 A * | 1/1998 | Pi | A47C 7/46 | 297/184.1 |
| 5,722,725 A * | 3/1998 | McNaughton | A47C 7/425 | 297/284.3 |
| 5,820,214 A * | 10/1998 | Bessette | B60N 2/7005 | 297/228.13 |
| 5,906,413 A * | 5/1999 | Yang | A47C 7/425 | 297/219.1 |
| 5,984,418 A * | 11/1999 | McInturff | A61G 5/1062 | 248/298.1 |
| 6,079,784 A * | 6/2000 | Peachey | B60N 2/6036 | 297/284.5 |
| 6,220,662 B1 | 4/2001 | Franco-Vila et al. | | |
| 6,299,248 B1 * | 10/2001 | Gennaro | A47C 7/425 | 297/219.1 |
| 6,332,651 B1 * | 12/2001 | Horisawa | A47C 7/742 | 297/219.1 |
| 6,352,307 B1 * | 3/2002 | Engman | A61G 5/1059 | 297/284.1 |
| 6,447,060 B1 | 9/2002 | Vila et al. | | |
| 6,450,579 B1 * | 9/2002 | Nylander | B60N 2/3011 | 297/378.1 |
| 6,474,735 B1 * | 11/2002 | Carnahan | B60N 2/2803 | 297/250.1 |
| 6,491,343 B2 * | 12/2002 | Yamazaki | B60N 2/062 | 248/346.01 |
| 6,793,287 B2 * | 9/2004 | Dunk | B60N 2/2881 | 297/219.12 |
| 7,156,465 B2 * | 1/2007 | Stewart, III | A47C 7/021 | 297/230.1 |
| 7,172,246 B1 * | 2/2007 | Itakura | B60N 2/6036 | 297/219.1 |
| 7,261,380 B2 * | 8/2007 | Ha | A61H 1/006 | 297/219.1 |
| 7,281,763 B1 * | 10/2007 | Hayashi | B60N 2/2893 | 297/253 |
| 7,488,036 B2 * | 2/2009 | Tache | A47C 31/00 | 297/219.1 |
| 7,600,335 B2 * | 10/2009 | Suprina | G09F 7/06 | 297/217.1 |
| 7,614,691 B1 * | 11/2009 | Schmitz | A47C 7/021 | 297/219.1 |
| 7,618,092 B2 * | 11/2009 | Yasuda | B60N 2/5816 | 297/224 |
| 7,757,321 B2 * | 7/2010 | Calvert | A43B 1/0081 | 248/118.1 |
| 8,256,836 B2 * | 9/2012 | Haut | B60N 2/2866 | 297/188.14 |
| 2009/0160230 A1 * | 6/2009 | Yasuda | B60N 2/5816 | 297/228.13 |
| 2009/0236888 A1 * | 9/2009 | Chew | A47C 7/467 | 297/284.5 |
| 2010/0244532 A1 * | 9/2010 | Fiore, Jr. | A47D 1/004 | 297/411.36 |
| 2010/0289307 A1 * | 11/2010 | Biaud | B60N 2/2872 | 297/250.1 |
| 2012/0280545 A1 * | 11/2012 | Vernon | A47C 7/425 | 297/230.1 |
| 2012/0280546 A1 * | 11/2012 | Hall | B60N 2/66 | 297/284.5 |
| 2012/0326478 A1 * | 12/2012 | Blind | B60N 2/02 | 297/284.3 |
| 2013/0069404 A1 * | 3/2013 | Ku | A47C 7/54 | 297/284.3 |
| 2013/0093225 A1 * | 4/2013 | Janowski | B60N 2/6018 | 297/223 |
| 2013/0200671 A1 | 8/2013 | Herzberg | | |
| 2013/0229036 A1 | 9/2013 | Bill et al. | | |

FOREIGN PATENT DOCUMENTS

| | | |
|---|---|---|
| WO | 9916638 | 4/1999 |
| WO | 0100437 | 1/2001 |
| WO | 2013085912 | 6/2013 |

\* cited by examiner

SEAT MODIFICATION ASSEMBLY AND AIRCRAFT PASSENGER SEAT COMPRISING A SEAT MODIFICATION ASSEMBLY

CROSS-REFERENCES TO RELATED APPLICATIONS

This application claims the benefit of the European patent application No. 13 196 619.4 filed on Dec. 11, 2013, the entire disclosures of which are incorporated herein by way of reference.

BACKGROUND OF THE INVENTION

The invention relates to a seat modification assembly for use with a passenger seat provided in a passenger cabin of an aircraft but also for use with a passenger seat provided in any other mass transport vehicle, such as, for example, a bus or a train.

In modern means of transport, particularly in an aircraft, there is currently no possibility of modifying the seating comfort on demand. The provided passenger seats are designed to meet the ergonomic demands of an average passenger. In other words, the seat comfort, the operating comfort, the spring comfort and the seat height, which directly influence the choice of the cushioning structure of the passenger seat, are chosen so as to meet the ergonomic demand and size of an average passenger.

When designing a passenger seat, particular attention is given to the aim of achieving an excellent seating comfort, i.e., a relaxed sitting position for the passenger. In order to prevent muscle tension of a passenger when sitting in the seat, a molded set geometry is provided. To further enhance the seating comfort, a not too soft and not too hard cushion, an ergonomic seating profile, a comfortable depth of the seat bottom cushion and also a comfortable seat height and degree of backrest angle is chosen. However, all these features only meet the comfort demands of a good sitting position of an average passenger.

As nearly every passenger has a different body size and also a different perception of what is a comfortable sitting position, there is the demand of creating a higher flexibility in passenger seat layout in order to allow a more individual adoption of the seating comfort. Self-control of the ergonomic layout of a seat is common nowadays in many everyday-situations, such as, when sitting on an office chair or in a car. Thus, the demand to also have this option in an aircraft or any other mass transport vehicle is increased, especially in view of a long travelling time.

A way of comfort modification for a passenger seat is already known from document DE 10 2008 053 140 B3 which shows a passenger seat having an adjustable seat surface. The seat surface is comprised of two seat bottom cushions respectively mounted to a seat shell element. The seat shell elements are slidable relative to one another so that a first front seat bottom cushion may be slid over a second seat bottom cushion abutting a back cushion. Thereby, a size and height of the seat surface may be adjusted.

A further way of comfort modification for a passenger seat is known from document WO 1999/016638 A1. According to WO 1999/016638 A1, not only the back rest but the whole seat, i.e., the back rest and the sitting surface of the seat, may be pivoted backwards so as to maintain the seating comfort in various inclined positions.

The underlying object of the present invention is to provide a higher flexibility in passenger seat layout, especially with regard to passenger individual demands and safety.

SUMMARY OF THE INVENTION

The seat modification assembly according to the invention is designed for use with a passenger seat provided in a mass transport vehicle, such as, for example, a bus or a train, and especially for use with a passenger seat provided in an aircraft. The seat modification assembly comprises at least one seat modification element which is adapted to change the ergonomic seating profile of a passenger seat provided with the seat modification assembly. The at least one seat modification element may be configured as a seat booster and/or a back support, such as, for example, a lumbar support, and/or a headrest or head support.

The at least one seat modification element of the seat modification assembly comprises at least one mounting means adapted for detachably mounting the seat modification element to a portion of the passenger seat with which the seat modification assembly may be provided. Preferably, each seat modification element comprises two said mounting means. Said at least one mounting means may be a zipper or a Velcro hook and loop fastener, especially one of two zipper or Velcro (hook and loop) elements adapted for interaction with one another, whereas the other zipper or Velcro element does not form a part of the mounting means of the seat modification element of the seat modification assembly but is provided on the passenger seat with which the seat modification assembly is to be used. However, instead of a zipper or Velcro fastener, every other known means adapted for detachable attachment of two parts to one another may be chosen as the at least one mounting means.

Advantageously, seat modification elements of the seat modification assembly may be provided in different degrees of hardness, so that a passenger may choose the degree of hardness of a seat modification element he or she wants to use according to his/her own preference. It is also conceivable that a seat modification element of the seat modification assembly has different sections of different degrees of hardness. These different degrees of hardness for different sections of the seat modification element may be chosen depending on the purpose the seat modification element is to fulfil with regard to improving the ergonomic seating comfort of the passenger.

A first seat modification element of the seat modification assembly may be a seat booster. Such a seat booster may be provided in different dimensions, especially in different heights, so as to fulfil the requirements with regard to different seating heights. For example, a rather high seat booster may be used for children to allow them to sit in a safety position within the passenger seat or for people having long legs so that they have more comfort in positioning their legs and do not have to sit in an uncomfortable position with highly angled legs. Children sitting in a raised position in a passenger seat are also more attentive when travelling, as their all-around visibility is improved. In this regard, the seat booster may especially be designed as a child seat so as to allow a child to sit in a normal passenger seat, especially within an aircraft, in a safer and more comfortable position. In this special configuration, the seat booster may be designed as or in accordance with a child seat known for cars. Providing passenger seats booked for small children, having an age in which they are supposed to use a child seat in a car, with a seat modification element in the form of a child seat, on the one hand, allows the child to sit in a more secure and comfortable sitting position and, on the other hand, also raises the overall comfort of the child sitting in the passenger seat. From such a raised position, for example, a screen provided in the back of the passenger seat in front is better visible.

Generally, the seat booster may be designed as or, irrespective of its special configuration, at least in accordance with a normal seat bottom cushion with regard to the molded seating geometry and seating depth and also with regard to cushion hardness. In other words, the seat booster may provide the same comfort as a normal bottom cushion of a passenger seat but in a more raised position.

It is also conceivable that there are seat boosters especially designed for handicapped passengers, such as those using a wheelchair. Due to the fact that passengers using a wheelchair are in a sitting position all day long, a seat booster which is not manufactured from a conventional foam material, but specifically designed in order to enhance the comfort of the handicapped passengers may be employed. Further, there is the option for everybody to buy a specially designed seat modification assembly manufactured according to his or her individual preferences. This is especially advantageous for disabled people with the need for a decubitus prophylaxis pad, for frequent travelers or also for passengers suffering from back pain, for example, or simply preferring an individualized seat modification.

According to an advantageous embodiment, especially in view of the seat booster being formed as a child seat, the seat booster is provided with seat width narrowing means. In other words, the seat booster may be provided with means defining a narrowed seating surface. Such seat width narrowing means allows for keeping thin and small passengers, such as children, in a predefined position within the passenger seat. To raise the seating comfort of the passenger, such seat width narrowing means may be provided with armrests. According to an advantageous embodiment, the seat width narrowing means of the seat booster are adapted to allow adjustment of a width of the seating surface of the seat booster. In other words, the width of the seating surface may be adjusted in accordance with the individual demand of the passenger by the seat width narrowing means. The seat width narrowing means may be detachably mounted to the seat booster. Thereby, one seat booster serves for all requirements with regard to seat surface width, as it provides a maximum seat surface width, when used without the seat width narrowing means, and also provides every other desirable seat surface width between the maximum and a minimum seat surface width, when used with the adjustable seat width narrowing means. For mounting the seat width narrowing means to the seat booster, any suitable mounting means may be used. Mounting means allowing a slidable mount of the seat width narrowing means to the seat booster, such as one or more guiding rails provided in the seat booster, are preferred.

Another seat modification element of the seat modification assembly may be formed as a back support and especially as a lumbar support. Such a back support may be provided in order to support a straight posture and ergonomic sitting position. It may be provided in the form of a cushion having a flat rear side for facing the backrest of the passenger seat, when mounted thereto, and a curved/bulged front side especially designed to ergonomically support the lower back of a passenger. Different curvatures of the front side of the back support or different dimensions of the bulge of the front side of the back support may be provided so as to meet the different passenger requirements.

As an alternative to the back support or in addition thereto, still another seat modification element of the seat modification assembly may be designed as a headrest or head support. Such a headrest is advantageously used together with a seat booster formed as a child seat and is then provided spaced to the seating surface of the seat booster by a distance such that the head of a child seated on the seat booster is securely supported by the headrest. In this connection, the safety of a child when seated in such a modified passenger seat is further improved, as, even though a child is already sitting in a raised position due to the seat booster, this raised position is normally not enough for the child's head to be supported by the regular head support of the passenger seat.

Such a headrest may be formed with head supporting means defining a head support area of the headrest, wherein the headrest is advantageously adapted to adjust a width of said head support area by adjustment of the head supporting means. Thereby, especially a safe support of a head of a child using such a headrest is ensured. For example, when used with a passenger seat in an aircraft, the width of the head support area of the headrest may be closely adapted to a passenger's head during take-off and landing and may be broadened to a more comfortable width to increase the freedom of movement during the flight. In general, the headrest may be especially adapted to support a head of a child. In this regard, the headrest may be formed in accordance with a headrest part of a known child seat for use within a car.

According to the invention, an aircraft passenger seat is provided with a seat modification assembly as described in the foregoing. Such an aircraft passenger seat further comprises at least one mounting means adapted for cooperation with at least one mounting means of the seat modification assembly. Such at least one mounting means may be a mounting element, for example in the form of a zipper element or a Velcro element, corresponding to a mounting element, such as a zipper or a Velcro element, of the seat modification assembly. In other words, the mounting means of the aircraft passenger seat and those of the seat modification assembly are adapted to interact so as to detachably attach the seat modification assembly to the aircraft passenger seat. In detail, the at least one mounting means of the aircraft passenger seat is adapted to cooperate with at least one mounting means of the seat modification assembly so as to mount the at least one seat modification element in a desired position on the aircraft passenger seat. For example, such mounting means may be provided in a lower portion of the backrest of the passenger seat so as to mount a seat modification element formed as a back support. In addition or alternatively, such mounting means may be provided on a bottom cushion of the aircraft passenger seat so as to mount a seat modification element formed as a seat booster. In addition or alternative to one or both of the above, such mounting means may be provided in a middle section or an upper portion of the backrest of the aircraft passenger seat so as to mount a seat modification element formed as a headrest.

In case the mounting means on the backrest of the passenger seat are at least one zipper element, this zipper element is preferably provided with a number of connecting means equal to the number of seat modification elements to be mounted to this zipper element. In other words, for each seat modification element to be mounted, the respective zipper element on the backrest of the passenger seat is preferably provided with a separate connecting assembly. In case the mounting means on the seat bottom cushion of the passenger seat are at least one zipper element, there may be only a single connecting assembly on the seat bottom cushion side zipper element, as only one seat modification element is to be mounted thereto.

Especially with regard to the aircraft passenger seat mounting means for a seat modification element designed as a back support or headrest, the mounting means of the aircraft passenger seat advantageously extend in the longitudinal direction of the backrest, at least within a lower backrest section and within an upper backrest section, for mounting the back support and headrest, respectively. Thereby, the mounting means of the aircraft passenger seat allow the attachment of one or more seat modification elements attachable to the aircraft passenger seat backrest in different positions along the longitudinal axis of the aircraft passenger seat backrest so as to fulfil different ergonomic requirements of the passengers. In other words, when one or more seat modification elements of the seat modification assembly are attached to the backrest of a passenger seat, there are sections of the mounting means of the aircraft passenger seat cooperating with mounting means of the seat modification assembly and non-cooperating sections. That is, the mounting means sections provided on the aircraft passenger seat backrest are longer than the mounting means sections provided on the seat modification elements to be mounted to the aircraft passenger seat backrest.

It is conceivable that the mounting means of the aircraft passenger seat provided on a backrest of the passenger seat for cooperation with mounting means of the seat modification assembly may be provided longitudinally along the whole passenger seat backrest, thereby allowing one or more seat modification elements of the seat modification assembly to be attached to the passenger seat backrest by using a common aircraft passenger seat mounting means. For example, only two mounting means may be provided on the aircraft passenger seat backrest, one extending along each side thereof. However, there may also be separate mounting means provided on the aircraft passenger seat backrest for cooperation with the mounting means of different seat modification elements. For example, four mounting means may be provided on the aircraft passenger seat back rest, two of which respectively extend section-wise along each side thereof for respectively mounting a seat modification element formed as a back support and one formed as a headrest.

Irrespective of the number of the mounting means provided on the aircraft passenger seat for cooperation with mounting means of seat modification elements of the seat modification assembly, the mounting means on the aircraft passenger seat are positioned such that they do not bother a passenger sitting in an aircraft passenger seat not provided with a seat modification assembly. In other words, it is preferable that the mounting means of the aircraft passenger seat are provided on side surfaces of the seat, especially on side surfaces of the bottom seat cushion and the backrest cushion of the aircraft passenger seat, i.e., not on a surface of the seat a passenger is intended to sit or lean on.

In case at least one mounting means of the aircraft passenger seat is a Velcro (hook and loop) connector, the mounting means provided on the aircraft passenger seat are designed with Velcro loops and the corresponding mounting means of the seat modification element of the seat modification assembly to be used with the aircraft passenger seat are provided with Velcro hooks. Thereby, clothes of a passenger sitting in an aircraft passenger seat not provided with a seat modification assembly will not get caught by the mounting means.

In general, each seat modification element may be formed as a cushion so that an aircraft passenger seat provided with a seat modification assembly is provided with at least one additional cushion, such as an additional seat bottom cushion, an additional lumbar cushion and/or an additional headrest cushion.

As a consequence, this invention gives the passengers the possibility of modifying a standard offered seat within any mass transport vehicle and especially within an aircraft by adding different seat modification elements, such as, for example, different seat cushions, to generate a most comfortable seat for every passenger. Thereby, a higher flexibility of the seat layout is achieved and a higher comfort for passengers can be offered on demand.

By using common mounting means for attaching a seat modification element to the passenger seat, some configurations of the seat layout may even be changed by the passengers themselves, thereby allowing them to adapt the sitting or resting position during the travel without the need to call someone for help, for example, a crew member in an aircraft. What seat modifications are possible and how they may be achieved can be described in a seating manual.

Especially within an aircraft, in dependence of the preference of the airline or the passengers, such seat layout modifications may only be performed by the cabin crew during a standard turn-around time or also on demand during the flight. Further, the described seat comfort modification gives the airline the possibility of reacting with flexibility to different flight scenarios, destinations, passenger numbers, different passenger sizes (women, men, kids) and also different passenger classes. For example, economy class seats may be easily switched to business class or at least economy plus class seats by providing them with an additional and more comfortable seat bottom cushion and/or lumbar cushion. The flexible seat layout thus gives an airline the possibility of easily switching between classes on demand, for example, in dependence of the respective booking numbers.

All in all, the described seat layout modifications increase the seating comfort, allow a flexible seat layout which is easy to handle for everybody and especially also fulfil the general requirements for aircraft, such as low weight and low costs of manufacturing and use.

Especially with regard to use in an aircraft, the flexible comfort modification can be realized as a marketing standard, thereby allowing airlines an advantage over others. The option of individual seat comfort modification may arouse the interest of a passenger for the airline which will positively affect the number of bookings for a flight. A key point for the airlines is the option to charge an extra fee if a passenger wants to make use of seat comfort modification. Thereby, the profit of the airline may be enhanced.

BRIEF DESCRIPTION OF THE DRAWINGS

There now follows a detailed description of preferred embodiments of the invention with reference to the accompanying schematic drawings.

DETAILED DESCRIPTION OF THE PREFERRED EMBODIMENTS

Figure 1:
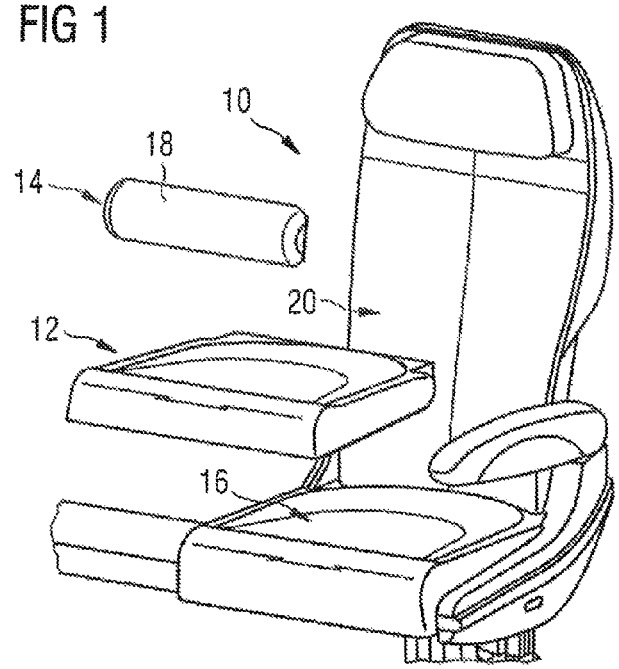
FIG. 1 shows a regular aircraft passenger seat and additional cushions in the form of a seat booster and a lumbar support to be used with the regular passenger seat according to a first embodiment of the invention.
Figure 2:
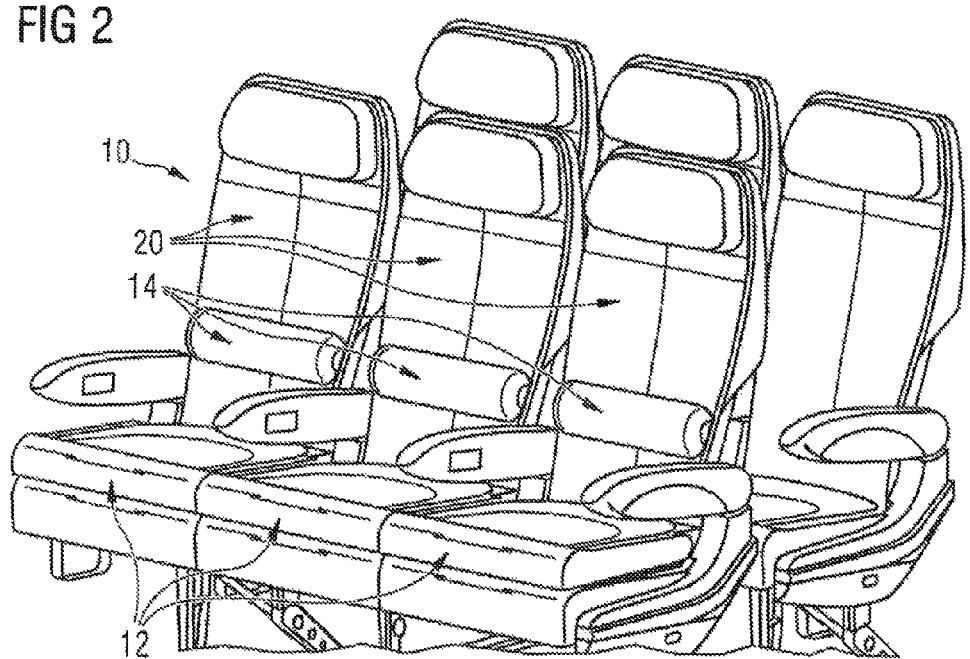
FIG. 2 shows a row of three regular passenger seats each provided with a seat booster cushion and a lumbar cushion as shown in FIG. 1.

FIG. 1 shows a regular passenger seat 10 usually provided within an aircraft cabin. As shown in FIG. 1, this regular passenger seat 10 may be provided with different seat modification elements, for example, different additional cushions. According to the first embodiment of FIGS. 1 and 2, these additional cushions are a seat bottom cushion 12 and a back support in the form of a lumbar cushion 14. The additional seat bottom cushion 12 in FIG. 1 has the form of a seat booster and, besides the fact that the seating height is raised, is designed in a similar way as a seat bottom cushion 16 of the regular passenger seat 10 shown in FIG. 1, at least with regard to degree of hardness and molded seat geometry. The additional lumbar cushion 14 is designed to serve as a support for the lower back of a passenger when sitting in a passenger seat 10 provided with the lumbar cushion 14 (FIG. 2). The lumbar cushion 14 has a curved/bolded front surface 18 for supporting the lower back of a passenger and a generally flat back surface (not shown) facing a backrest 20 of the regular passenger seat 10, when mounted thereto. In general, the curvature or the dimension of the bulge of the front surface 18 of the lumbar cushion 14 is chosen so as to ergonomically support the lower back of a passenger, when seated.

FIG. 2 shows a triple seat row within an aircraft passenger cabin with each of the regular passenger seats 10 being provided with an additional seat bottom cushion 12 and an additional lumbar cushion 14, as shown in and described above with reference to FIG. 1. As is visible from FIG. 2, the lumbar cushions 14 are respectively attached to the backrests 20 of the regular passenger seats 10 spaced a predetermined distance from the seating surface now defined by the additional seat bottom cushions 12 respectively provided on each of the regular passenger seats 10, so as to support the lower back of a passenger when seated in such a modified passenger seat 10. As described in the following with reference to FIG. 5, this distance or mounting height of the lumbar cushions 14 is individually adjustable within given sections of the backrests 20 of the regular passenger seats 10.

The seat comfort modification as shown in FIG. 2 or at least parts thereof may especially be offered to an adult person or taller child booked on an economy class seat but may also be offered for any other passenger seat within an aircraft cabin or even on the cockpit seats.

Figure 3:
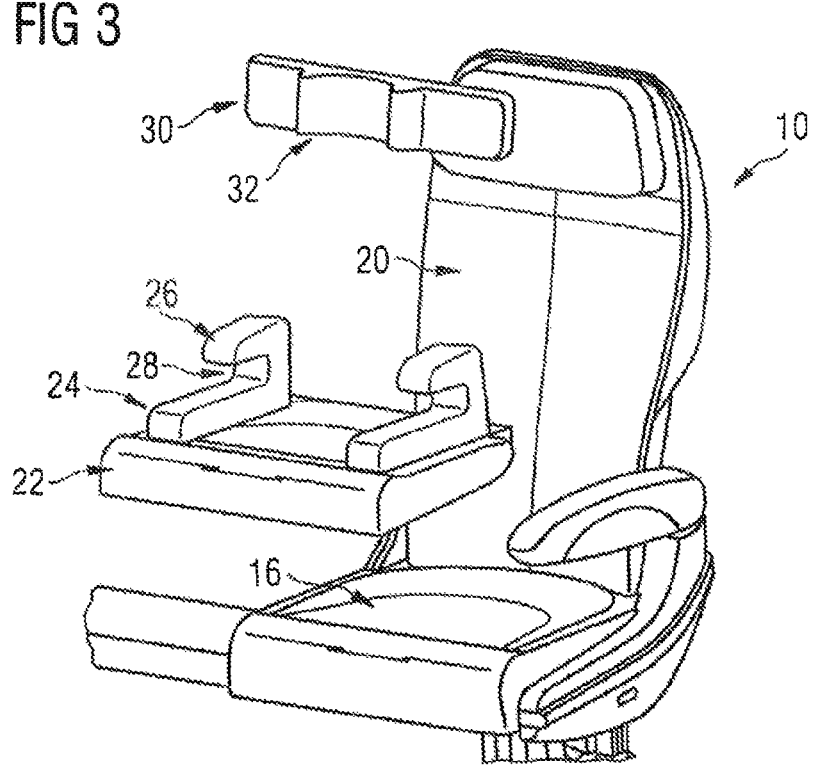
FIG. 3 shows a regular passenger seat and a seat booster in the form of a child seat and a headrest to be used with the regular passenger seat according to a second embodiment of the present invention.

FIG. 3 shows a second embodiment of the present invention, according to which an additional seat bottom cushion 22 with which a regular passenger seat 10 may be provided is formed as a child seat. The child seat may be simply designed in accordance with a known child seat for use in cars for children at an age at which they are still supposed to use a seat booster. Such a child seat bottom cushion 22 may be provided instead of the additional seat bottom cushion 12 shown in FIGS. 1 and 2 on a regular passenger seat 10.

The child seat bottom cushion 22 is advantageously designed with seat width narrowing means 24 which may be adapted to adjust the width of the seat of the child seat bottom cushion 22 to a child to be seated in the child seat bottom cushion 22. In addition, the child seat bottom cushion 22 may also be provided with armrests 26 to increase the comfort of a child, when seated thereon. According to the embodiment shown in FIG. 3, such armrests 26 are integrally formed with the seat width narrowing means 24, thereby advantageously building a recess 28 for guiding a seat belt.

Apart from the features specially described with reference to the child seat shown in FIG. 3, the child seat bottom cushion 22 and its seating surface may also be designed similar to the additional seat bottom cushion 12 described above with reference to FIGS. 1 and 2, at least with regard to degree of hardness and molded seat geometry.

Instead of the lumbar cushion 14 described for the comfort modification shown in FIGS. 1 and 2 with reference to the first embodiment of the present invention, the seat modification assembly shown in FIG. 3 further comprises a head support cushion 30. The head support cushion 30, which is formed as a headrest, comprises head supporting means 32, which, according to FIG. 3, are generally U-shaped in order to support a head of a child, especially between the two legs of the U. These head supporting means 32 define a head support area of the headrest 30, wherein the width of said head support area is preferably adjustable. It is for example conceivable that the two legs of the U-shape of the head supporting means 32 are pivotable with respect to the headrest 30 so as to selectively increase the width of the head support area to provide the child's head with a comfortable movement range at least after having reached the flight altitude. During take-off and landing, it is however preferred to narrow the head support area defined by the head supporting means 32 so as to securely support the child's head.

Figure 4:
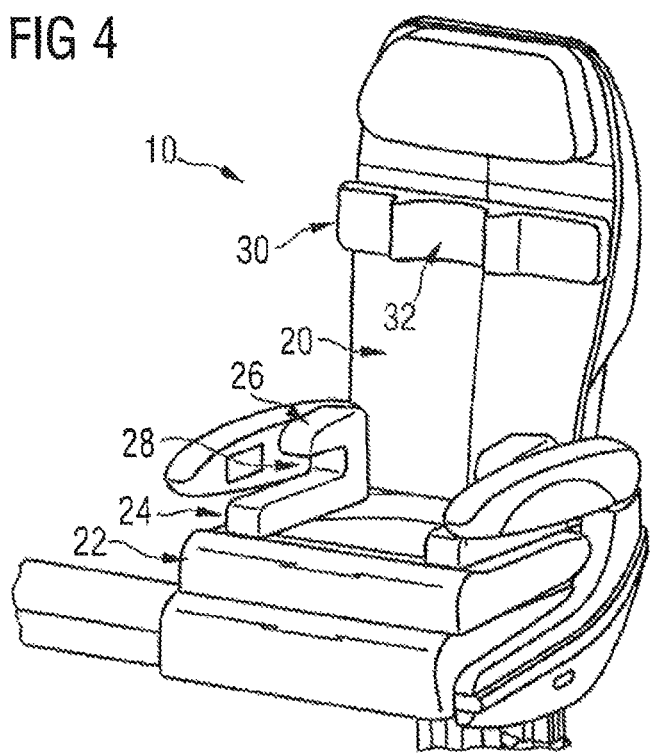
FIG. 4 shows the regular passenger seat of FIG. 3 provided with the child seat and the headrest shown in FIG. 3.

FIG. 4 shows a regular passenger seat 10 provided with the child seat bottom cushion 22 and the head support cushion 30, shown in FIG. 3. As shown in FIG. 4, the child seat bottom cushion 22, when installed on the seat bottom cushion 16 of the regular passenger seat 10, provides a narrowed seating surface in a raised sitting position. In a predefined distance from the seating surface of the child seat bottom cushion 22, the head support cushion 30 is mounted to the backrest 20 of the regular passenger seat 10, wherein the distance is such that the head of a child seated on the child seat bottom cushion 22 is securely supported by the head support cushion 30.

Figure 5:
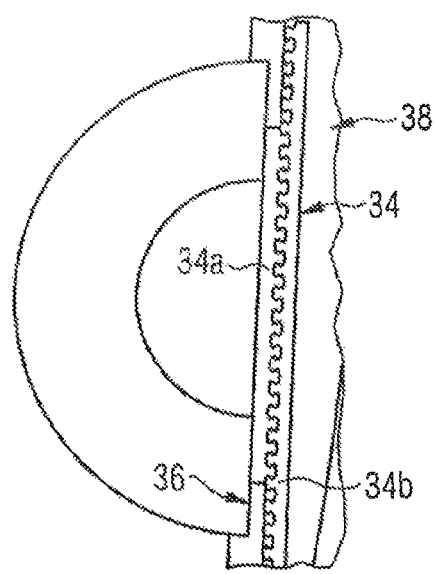
FIG. 5 shows a side view of a section of a backrest of a regular passenger seat to which a back support in the form of a lumbar cushion is mounted by a zipper, and in FIG. 6 shows a side view of a section of a bottom seat cushion of a regular passenger seat to which a seat booster is mounted by a zipper.

FIG. 5 shows one way of mounting a back support, such as a lumbar cushion 14, to the backrest 20 of a regular passenger seat 10. In FIG. 5, a zipper configuration is shown as cooperating mounting means 34, wherein a first zipper element 34a is provided on the lumbar cushion 14 and a second zipper element 34b is provided on the backrest 20 of the regular passenger seat 10. Advantageously, the lumbar cushion 14 is attachable to the backrest 20 in different positions along the longitudinal axis of the backrest 20 of the regular passenger seat 10. Therefore, the first zipper element 34a provided on the backrest 20 of the regular passenger seat 10 is longer than the second zipper element 34b provided on the lumbar cushion 14. Preferably, the first zipper element 34a is two times the length of the second zipper element 34b and extends in a longitudinal section of a lower portion of the backrest 20 so that the lumbar cushion 14 may be selectively mounted in the right position for each passenger, irrespective of the use of a seat booster in the form of an additional seat bottom cushion 12 or a child seat 22.

As shown in FIG. 5, the cooperating zipper elements 34a, 34b of the lumbar cushion 14 and the backrest 20 of the regular passenger seat 10 are respectively provided on a side face 36 of the lumbar cushion 14 and a side face 38 of the backrest 20 of the regular passenger seat 10. Thereby, the seating comfort of a passenger is not affected in case no seat comfort modification is used.

Even though only one zipper configuration 34 is visible in FIG. 5, the lumbar cushion 14 and the backrest 20 of the regular passenger seat 10 are respectively provided with a further, namely a second zipper configuration similar to the one shown in FIG. 5 on the opposite side faces (not shown) of the lumbar cushion 14 and backrest 20.

Figure 6:
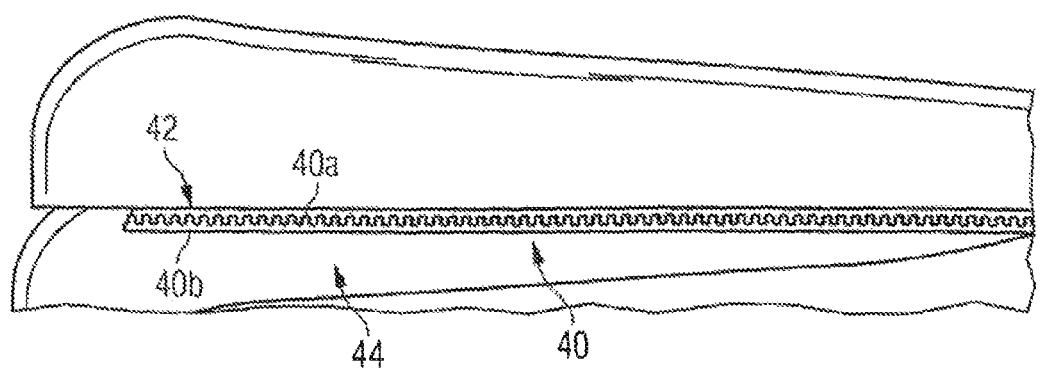

As shown in FIG. 6, also the additional seat bottom cushion 12 may be mounted to the seat bottom cushion 16 of the regular passenger seat 10 by at least one zipper configuration 40. For mounting the additional seat bottom cushion 12 to the seat bottom cushion 16 of the regular passenger seat 10, cooperating zipper elements 40a, 40b respectively provided on the additional seat bottom cushion 12 and the seat bottom cushion 16 of the regular passenger seat 10 are equal in the length and respectively arranged such that the additional seat bottom cushion 12 may be installed over the regular seat bottom cushion 16. As described before for mounting the lumbar cushion 14, also the zipper elements 40a, 40b of the additional seat bottom cushion 12 and the regular seat bottom cushion 16 are provided on side faces 42, 44 thereof. Thereby, the seating comfort of a passenger is not affected when seated on the regular seat bottom cushion 16 not provided with the additional seat bottom cushion 12. Further, also for installing the additional seat bottom cushion 12, an additional second zipper configuration on the opposite side faces (not shown) of the additional seat bottom cushion 12 and the regular seat bottom cushion 16 is advantageously provided, the second zipper configuration being similar to the first zipper configuration.

The child seat bottom cushion 22 as shown in FIGS. 3 and 4 may be installed to the regular seat bottom cushion 16 of the regular passenger seat 10 in the same way as described for the additional seat bottom cushion 12 with reference to FIG. 6.

Further, the head support cushion 30 shown in FIGS. 3 and 4 may be installed on the backrest 20 of the regular passenger seat 10 in the same way as described for the lumbar cushion 14 with reference to FIG. 5.

Instead of a zipper, also a Velcro hook and loop fastener may be used for attaching the additional seat bottom cushion 12, the additional lumbar cushion 14, the child seat bottom cushion 22 and/or the head support cushion 30 to a regular passenger seat 10. In this regard, the Velcro element/s with the loop surface is/are advantageously provided on the regular passenger seat 10 and the Velcro element/s with the hook surface on the respective seat modification element/s, such as the additional seat bottom cushion 12, the additional lumbar cushion 14, the child seat bottom cushion 22 and/or the head support cushion 30. Thereby, clothes of a passenger may not get caught by the Velcro hooks, when sitting on a regular passenger seat 10 not provided with one or more such seat modification elements. In general, the mounting means features described before with specific reference to the zipper configuration also apply for the Velcro configuration.

With regard to a regular passenger seat 10 which is to be used with a back support, such is a lumbar cushion 14, and/or a head support cushion 30, the backrest 20 of the regular passenger seat 10 may be provided with a single zipper or a single Velcro element on each side surface 38 of the backrest 20, thereby allowing both or only one of the back support 14 and the headrest 30 to be installed on the backrest 20 of the regular passenger seat 10 by the only one zipper/Velcro element on the backrest side. However, it is also conceivable that the side surfaces 38 of the backrest 20 of the regular passenger seat 10 are provided with a plurality, especially four zipper/Velcro elements, two of which respectively provided for cooperation with zipper/Velcro elements on a lumbar cushion 14 and a headrest 30.

The above described embodiments allow an easy way to enhance/individualize the seating comfort in a regular passenger seat and also to enhance the security of children when travelling in a mass transport vehicle. A higher comfort for adult passengers and a higher security for children may be reached in an easy way according to the invention by installing some additional cushions on regularly offered passenger seats within an aircraft cabin or other mass transport vehicle. As the installation of such additional cushions may simply be achieved by the use of a zipper or Velcro configuration or also by any other common mounting means, such as, for example, push buttons, seat comfort modification may be performed by every passenger itself and according to his/her own preferences on demand. Thereby, each passenger has the opportunity to enjoy a more comfortable sitting or relaxing position when travelling. Advantageously, a zipper or Velcro fastener is used for mounting the additional cushions to the regular passenger seat as both of these mounting means are very light weight, inexpensive and also easy to handle for everybody. Further they do not take up much space.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A seat modification assembly for use with a passenger seat provided in a mass transport vehicle the seat modification assembly comprising:
   at least one seat modification element adapted to change the ergonomic seating profile of a passenger seat provided with the seat modification assembly, a first of said at least one seat modification element of the seat modification assembly being formed as a seat booster having a seating surface,
   wherein the at least one seat modification element comprises at least one mounting arrangement adapted to detachably mount the seat modification element to a portion of the passenger seat,
   wherein seat width narrowing elements are slidably mounted to a top of the seating surface of the seat booster at mounting points, said seat width narrowing elements adapted to adjust the width of the seating surface of the seat booster by sliding over the seating surface of the seat booster, and
   wherein the seat width narrowing elements slide at the mounting points, wherein at least one of the seat width narrowing elements is displaceable over the top of the seating surface and in a direction substantially parallel to the seating surface of the seat booster.

2. The seat modification assembly according to claim 1, wherein the seat width narrowing elements are provided with armrests.

3. The seat modification assembly according to claim 1, wherein the seat booster is formed as a child seat.

4. The seat modification assembly according to claim 1, wherein the seat booster is formed as an additional seat bottom cushion adapted to ergonomically support a handicapped person.

5. The seat modification assembly according to claim 1, wherein a second of the at least one seat modification element of the seat modification assembly is formed as a back support.

6. The seat modification assembly according to claim 5, wherein the back support is formed as a lumbar support.

7. The seat modification assembly according to claim 5, wherein a further seat modification element of the seat modification assembly is formed as a headrest.

8. The seat modification assembly according to claim 1, wherein a third of the at least one seat modification element of the seat modification assembly is formed as a headrest.

9. The seat modification assembly according to claim 8, wherein the headrest is formed with a head support area, and the headrest is adapted such that the width of said head support area is adjustable.

10. The seat modification assembly according to claim 8, wherein the headrest is adapted to support a head of a child.

11. The seat modification assembly according to claim 1, wherein the seat modification element has sections with different degrees of hardness.

12. The seat modification assembly according to claim 1, wherein at least one of the at least one mounting arrangement of the seat modification assembly is a zipper.

13. The seat modification assembly according to claim 1, wherein at least one of the at least one mounting arrangement of the seat modification assembly is a hook and loop fastener.

14. The seat modification assembly according to claim 1, wherein the seat width narrowing elements are detachably mounted to the seat booster.

15. An aircraft passenger seat comprising:
a seat modification assembly comprising:
at least one seat modification element adapted to change the ergonomic seating profile of a passenger seat provided with the seat modification assembly, a first seat modification element of the seat modification assembly being formed as a seat booster having a seating surface,
wherein the at least one seat modification element comprises at least one mounting arrangement adapted to detachably mount the seat modification element to a portion of the passenger seat, and
the at least one mounting arrangement comprises a mounting device adapted for cooperation with at least one mounting device of the seat modification assembly,
wherein the at least one mounting device of the aircraft passenger seat is adapted to cooperate with at least one mounting device of the seat modification assembly so as to detachably mount the at least one seat modification element in a desired position at the aircraft passenger seat,
wherein seat width narrowing elements are slidably mounted to a top of the seating surface of the seat booster at mounting points, said seat width narrowing elements are adapted to adjust the width of the seating surface of the seat booster by sliding over the seating surface of the seat booster, and
wherein the seat width narrowing elements slide at the mounting points, wherein at least one of the seat width narrowing elements is displaceable over the top of the seating surface and in a direction substantially parallel to the seating surface of the seat booster.

16. The aircraft passenger seat according to claim 15, wherein at least one of the at least one mounting arrangement of the seat modification assembly is a zipper.

* * * * *